United States Patent Office 2,975,191
Patented Mar. 14, 1961

2,975,191

REDUCTION OF 1,3-DICARBALKOXY-PYRROLIDINE TO N-METHYL-3-PYRROLIDYLMETHYL ALCOHOL

Yao Hua Wu, Evansville, Ind., assignor to Mead Johnson & Company, Evansville, Ind., a corporation of Indiana No Drawing. Filed May 6, 1959, Ser. No. 811,290

3 Claims. (Cl. 260—326.5)

This invention relates to chemical reduction and has for an object the provision of a process for preparing 1-methyl-3-pyrrolidylmethyl alcohol.

The compound produced by the process of this invention is disclosed in Feldkamp and Wu United States Patent No. 2,826,588, dated March 11, 1958. This compound, as pointed out in that patent, is particularly useful as in intermediate for the preparation of certain pharmaceutical products.

In accordance with this invention, 1-methyl-3-pyrrolidylmethyl alcohol is prepared by reducing a 1,3-dicarbalkoxypyrrolidine with a complex metal hydride. The hydride reducing agent is preferably an alkali metal aluminum hydride, such as lithium aluminum hydride, sodium aluminum hydride or potassium aluminum hydride. The reduction is preferably carried out in the presence of an anhydrous organic solvent under reflux conditions. The 1,3-dicarbalkoxypyrrolidine starting material may be prepared from a 1,3-dicarbalkoxy-4-pyrrolidinone by a series of reactions as described by Masuo Miyamoto, Yakugaku Zasshi 77, 568 (1957); Chem. Abst. 51, 16422e (1957).

For a more complete understanding of this invention, reference will now be made to a specific example for carrying out the process.

*1,3-dicarbethoxy-4-pyrrolidinone*

This compound was prepared by the procedure of Kuhn and Osswald, Chem. Ber. 89, 1423 (1956) and had a melting point between 60° and 62° C.

*1,3-dicarbethoxy-4-pyrrolidinol*

A solution of 1,3-dicarbethoxy-4-pyrrolidinone (58.0 g., 0.25 mole) in 250 ml. of absolute ethanol was hydrogenated under 50 p.s.i. pressure of hydrogen using platinum oxide as the catalyst. The theoretical amount of hydrogen was absorbed in sixteen hours. The catalyst was filtered off and the filtrate concentrated. The crude 1,3-dicarbethoxy-4-pyrrolidinol was obtained by distilling the residue in vacuo; B.P. 134–164° (0.2–0.3 mm.); $n_D^{25}$ 1.4730. The pure product was collected as a colorless oil by redistilling the crude compound; B.P. 164–167° (0.18 mm.); $n_D^{25}$ 1.4722.

*1,3-dicarbethoxy-$\Delta^3$-pyrroline*

A mixture of 1,3-dicarbethoxy-4-pyrrolidinol (23.1 g., 0.1 mole), acetic anhydride (69 ml.) and anhydrous sodium acetate (2.5 g.) was refluxed for five and one-half hours. The acetic anhydride was removed by distillation. The residual crystalline slurry was treated with 150 ml. of ether and the solid collected on a filter. The solid was dissolved in 50 ml. of water and the aqueous solution extracted several times with ether. The filtrate was mixed with the ethereal extracts, dried over anhydrous magnesium sulfate and concentrated. The oily residue was distilled in vacuo to give 19.9 g. of a light colored distillate. The pure 1,3-dicarbethoxy-$\Delta^3$-pyrroline was obtained as a colorless oil by redistilling the crude compound; B.P. 155–160° (9mm.); $n_D^{25}$ 1.4748.

*1,3-dicarbethoxypyrrolidine*

A solution of 1,3-dicarbethoxy-$\Delta^3$-pyrroline (17.1 g., 0.08 mole) in 75 ml. of absolute ethanol was hydrogenated under 50 p.s.i. pressure of hydrogen using platinum oxide as the catalyst. The theoretical amount of hydrogen was absorbed in six hours. The mixture was filtered. After removing the solvent the residual oil was distilled in vacuo to yield 1,3-dicarbethoxypyrrolidine as a colorless oil; B.P. 152–158° (10 mm.); $n_D^{25}$ 1.4582.

*1-methyl-3-pyrrolidylmethyl alcohol*

To a slurry of 2.0 g. of lithium aluminum hydride (0.053 mole) in 50 ml. of anhydrous ether was added dropwise a solution of 1,3-dicarbethoxypyrrolidine (4.3 g., 0.02 mole) in 25 ml. of anhydrous ether at such a rate that gentle refluxing was maintained. The mixture, after being stirred and refluxed for an additional five hours, was cooled in an ice bath and treated carefully with 2.9 ml. (0.16 mole) of water. The whole was filtered and the filter cake extracted with two 75-ml. portions of ethanol. The alcoholic filtrate and ethereal extract were combined and concentrated by distillation. The oily residue was distilled in vacuo to collect 1-methyl-3-pyrrolidylmethyl alcohol as a colorless oil; B.P. 85–90° (10 mm.); $n_D^{25}$ 1.4662.

While a particular embodiment of this invention is shown above, it will be understood, of course, that the invention is not to be limited thereto, since many modifications may be made, and it is contemplated, therefore, by the appended claims to cover any such modifications as fall within the true spirit and scope of this invention.

I claim:

1. A process of preparing 1-methyl-3-pyrrolidylmethyl alcohol which comprises contacting 1,3-dicarbalkoxypyrrolidine with an alkali metal aluminum hydride in the presence of an organic solvent.

2. A process of preparing 1-methyl-3-pyrrolidylmethyl alcohol which comprises contacting 1,3-dicarbethoxypyrrolidine with an alkali metal aluminum hydride in the presence of an anhydrous organic solvent under reflux conditions.

3. The process of claim 2 wherein said hydride is lithium aluminum hydride.

References Cited in the file of this patent

Fuson et al.: J. Am. Chem. Society, vol. 70, page 2761 (1948).

Krajkemann: Manufacturing Chemist (vol. XXII, 4), page 147 (1951).

Doukas et al.: J. Am. Chem. Society, vol. 75, page 5355 (1953).